US012460156B2

(12) United States Patent
Hedbom et al.

(10) Patent No.: US 12,460,156 B2
(45) Date of Patent: Nov. 4, 2025

(54) SOFTENING AND CONDITIONING AGENTS FOR TEXTILE ARTICLES

(71) Applicant: SVENSKA KRÄMFABRIKEN AB, Falun (SE)

(72) Inventors: Torsten Hedbom, Falun (SE); Mark Lawther, Roskilde (DK)

(73) Assignee: SVENSKA KRÄMFABRIKEN AB, Falun (SE)

( * ) Notice: Subject to any disclaimer, the term of this patent is extended or adjusted under 35 U.S.C. 154(b) by 850 days.

(21) Appl. No.: 17/320,618

(22) Filed: May 14, 2021

(65) Prior Publication Data

US 2021/0269745 A1 Sep. 2, 2021

Related U.S. Application Data

(63) Continuation of application No. PCT/EP2019/083063, filed on Nov. 29, 2019.

(30) Foreign Application Priority Data

Nov. 30, 2018 (SE) .................................... 1851494-3

(51) Int. Cl.

| | |
|---|---|
| ***C11D 1/00*** | (2006.01) |
| ***B08B 3/04*** | (2006.01) |
| ***C11D 3/00*** | (2006.01) |
| ***C11D 3/22*** | (2006.01) |
| ***D06M 15/03*** | (2006.01) |
| ***D06M 19/00*** | (2006.01) |
| *D06M 101/06* | (2006.01) |

(52) U.S. Cl.

CPC ............ *C11D 3/0015* (2013.01); *C11D 3/222* (2013.01); *D06M 15/03* (2013.01); *D06M 19/00* (2013.01); *C11D 2111/12* (2024.01); *D06M 2101/06* (2013.01)

(58) Field of Classification Search

CPC ........... C11D 1/00; C11D 3/0015; C11D 3/22; C11D 3/222; C11D 11/0017; B08B 3/04; D06M 15/03; D06M 19/00; D06M 2101/06

See application file for complete search history.

(56) References Cited

U.S. PATENT DOCUMENTS

| | | | | | |
|---|---|---|---|---|---|
| 7,012,053 | B1 | 3/2006 | Barnabas et al. | | |
| 7,858,139 | B2 * | 12/2010 | Kvist | ..................... A23C 15/12 | 426/601 |
| 2007/0128331 | A1 * | 6/2007 | Kvist | ....................... A61K 8/73 | 426/602 |

FOREIGN PATENT DOCUMENTS

| | | | |
|---|---|---|---|
| CN | 1332788 | A | 1/2002 |
| CN | 1894391 | A | 1/2007 |

(Continued)

OTHER PUBLICATIONS

International Search Report for PCT Patent App. No. PCT/EP2019/083063 (Mar. 12, 2020).

(Continued)

*Primary Examiner* — Brian P Mruk

(74) *Attorney, Agent, or Firm* — Cermak & McGowan LLP; Malcolm K. McGowan

(57) ABSTRACT

The present invention relates to fabric softeners and washing detergents comprising water soluble 1,3:1,4-β-D-glucans (β-glucans) for treating and softening textiles and fabrics derived from cellulose and/or protein-based fibers, and a method for treating and softening such textiles and fabrics.

23 Claims, 3 Drawing Sheets

(56) References Cited

FOREIGN PATENT DOCUMENTS

| | | | | |
|---|---|---|---|---|
| CN | 104622778 | A | 5/2015 | |
| CN | 106265259 | A | 1/2017 | |
| CN | 106367212 | A | 2/2017 | |
| CN | 106883958 | A | 6/2017 | |
| CN | 106967541 | A | 7/2017 | |
| CN | 107502474 | A | 12/2017 | |
| EP | 0930334 | A1 | 7/1999 | |
| EP | 1790687 | * | 5/2007 | ................ C08L 5/00 |
| EP | 1790687 | A2 | 5/2007 | |
| JP | 6-116586 | A | 4/1994 | |
| JP | 2014-005209 | A | 1/2014 | |
| JP | 2017-025443 | A | 2/2017 | |
| KR | 20170114565 | A | 10/2017 | |
| WO | WO99/36469 | A1 | 7/1999 | |

OTHER PUBLICATIONS

International Preliminary Report on Patentability for PCT/EP2019/083063 (Feb. 26, 2021).

"Oat and Beta-Glucan Washing Liquid for Bottles, Fruits and Vegetables," Jul. 2012, Record ID: 1837859, Mintel, China, http://www.gnpd.com, 3 pp.

English translation of Office Action from Chinese Patent App. No. 201980078268.8 (Sep. 19, 2022).

* cited by examiner

SOFTENING AND CONDITIONING AGENTS FOR TEXTILE ARTICLES

CROSS-REFERENCE TO RELATED APPLICATIONS

This application is a continuation of PCT/EP2019/083063, filed 29 Nov. 2019, which claims priority from Swedish patent applications SE 1851494-3, filed 30 Nov. 2018. The contents of these priority applications are incorporated herein by reference in their entirety.

TECHNICAL FIELD

The present invention relates to fabric softeners and washing detergents comprising water soluble β-glucan for treating and softening textiles and fabrics derived from cellulose and/or protein-based fibers, and a method for treating and softening such textiles and fabrics.

BACKGROUND

Fabric softeners help keep clothes soft and colorful. While many people use fabric softeners when they do their laundry, most are unaware of the chemicals that are included in such softeners. Many softener manufacturers do not specify the exact compounds they use to help soften fabric. Unfortunately, many softeners are made from a wide mixture of chemicals that can have potentially hazardous effects on the human body over time.

Conventional fabric softeners are either a liquid that you pour into the rinse cycle of your washing machine, or a sheet that is thrown into a dryer with your clothes. Both contain compounds that are especially harmful to children. Fabric softeners also often contain a cocktail of non-renewable petroleum-based chemicals, which are not easily biodegradable and can become highly toxic to aquatic life once they are washed down the drain. Studies have shown that certain chemicals found in fabric softeners are likely human carcinogens, developmental toxicants and allergens that can contribute to eczema. Since fabric softeners are designed to stay in your clothes for extended periods of time, such chemicals can seep out gradually and be inhaled or absorbed directly through the skin.

In view of this situation, it has been an object to find greener and safer ways to soften clothes and reduce static cling without exposing the body and the environment to harmful toxic or carcinogenic ingredients.

SUMMARY

This object is met by providing a washing detergent formulation and/or fabric softening agent comprising one or more water soluble 1,3:1,4-β-D-glucans (β-glucans). β-Glucans comprise a group of β-D-glucose polysaccharides naturally occurring in the cell walls of cereals, bacteria, and fungi, with significantly differing physicochemical properties dependent on source. Typically, β-glucans form a linear backbone with 1-3 β-glycosidic bonds but vary with respect to molecular mass, solubility, viscosity, branching structure, and gelation properties. The β-glucans used in the washing detergent formulation and/or fabric softening agent as disclosed herein are derived from cereals only since β-glucans derived from other sources are insoluble in water. Cereal β-glucans—including β-glucan from oat, barley, and wheat—are linear polysaccharides joined by 1,3 and 1,4 carbon linkages. The one or more water soluble 1,3:1,4-β-

D-glucans used as a washing detergent and/or as a fabric softening agent as disclosed herein are derived from oats, barley or a combination thereof.

The one or more water soluble 1,3:1,4-β-D-glucans may be derived from oat.

The one or more water soluble 1,3:1,4-β-D-glucans may be derived from barley.

β-glucan extraction from cereal can be difficult due to tendency of depolymerization-which often occurs in high pH. Processes which describe extraction of long chain β-glucans, and any subsequent control of size are set out, for example, in EP 1 363 504 B1, EP 1 706 001 B1 and GB patent application 1501799.9. Advantageously the one or more water soluble 1,3:1,4-β-D-glucans used as a washing detergent and/or as a fabric softening agent as disclosed herein have a mean molecular weight of at least 50,000, at least 100,000, at least 200,000, at least 400,000, at least 800,000, at least 1,200,000 or at least 1,600,000 Daltons.

The one or more water soluble 1,3:1,4-β-D-glucans may have been treated with a β-D-(1-3) glucanase.

The majority of cereal β-glucan bonds consist of 3 or 4 beta-1,4 glycosidic bonds (trimers and tetramers) interconnected by 1,3 linkages. Glucanases are enzymes that break down glucans, and β-1,3-glucanase is an enzyme that breaks down the β-1,3-glucans of water soluble 1,3:1,4-β-D-glucans. Treatment of the water soluble 1,3:1,4-β-D-glucans with β-1,3-glucanase will increase the number of β-glucan chains with free cellotetraosyl ends and thereby increase the number of cellulose or polypeptide polymer chains which may be bound by any given β-glucan chain. However, advantageously no more than 20% of the β-d-(1-3) linkages, no more than 10% of the β-d-(1-3) linkages, or no more than 5% of the β-d-(1-3) linkages in the water soluble 1,3:1,4-β-D-glucans have been cleaved during the treatment with β-D-(1-3) glucanase.

Advantageously the one or more water soluble 1,3:1,4-β-D-glucans have, prior to being cleaved, a mean molecular weight of at least 800,000 Daltons, preferably of at least 1,200,000 Daltons and most preferably of at least 1,600,000 Daltons.

Advantageously said washing detergent and/or fabric softening agent comprises at least one of anionic, cationic, nonionic and or amphoteric detergents. A detergent is a surfactant or a mixture of surfactants with cleansing properties in dilute solutions.

Typical anionic detergents are alkylbenzenesulfonates. The alkylbenzene portion of these anions is lipophilic and the sulfonate is hydrophilic. Advantageously the anionic detergent is selected from the group consisting of soap, Sodium Lauryl ethyl Sulphate, MIPA laureth sulphate, Alfa Olefin Sulphonate, Sodium Lauroyl Glutamate.

Cationic detergents that are similar to the anionic ones, with a hydrophilic component, but, instead of the anionic sulfonate group, the cationic surfactants have quaternary ammonium as the polar end. Advantageously the cationic detergent is selected from the group consisting of Esterquats, Alkyl Quaternary Ammoinium salts.

Non-ionic detergents are characterized by their uncharged, hydrophilic headgroups. Typical non-ionic detergents are based on polyoxyethylene or a glycoside. Advantageously the nonionic detergent is selected from the group consisting of Alkyl Polyglucoside, Fatty Alcohol Ethoxylate, Glucamides. Advantageously the nonionic detergent is selected from the group consisting of Cocamidepropyl Betaine, Amine Oxide, Amphoacetate.

The one or more 1,3:1,4-β-D-glucans are included in the composition in an amount of 0.005-5 wt.-%, preferably 0.007-2 wt.-%, more preferably 0.01-0.5 wt.-% (calculated on a total weight of the composition).

The composition is a powder or a liquid.

A further object has been to provide a laundry composition comprising the washing detergent formulation and/or fabric softening agent as described above.

The laundry composition may be used as a washing detergent.

The laundry composition may be used as a fabric softener.

A further object has been to provide a process for treating and softening textile fibers and/or fabrics derived from cellulose and/or protein-based fibers, wherein said process the textile fibers and/or fabrics are treated, as part of a washing regime, or a pre- or post-washing regime with the washing detergent formulation and/or fabric softening agent as described herein.

The textile fibers and/or fabrics to be treated are of the group consisting of cotton, viscose or rayon, wool, silk, an article containing feathers or a combination thereof.

The textile fibers and/or fabrics to be treated are advantageously made from cotton.

The textile fibers and/or fabrics to be treated are advantageously made from viscose or rayon.

The textile fibers and/or fabrics to be treated are advantageously made from wool.

The textile fibers and/or fabrics to be treated are advantageously made from silk.

The textile fibers and/or fabrics to be treated are advantageously articles containing feathers.

The washing detergent formulation and/or fabric softening agent as described herein is advantageously used for treating textile fibers and/or fabrics derived from cellulose and/or protein-based fibers.

DETAILED DESCRIPTION

It has been beneficially discovered that the addition of water-soluble β-glucan to fabrics derived from natural textile fiber sources (i.e. those based on cellulose and proteins) can produce a noticeable and assessable, sensorially significant, softening effect on the treated textile fabric.

Figure 1:
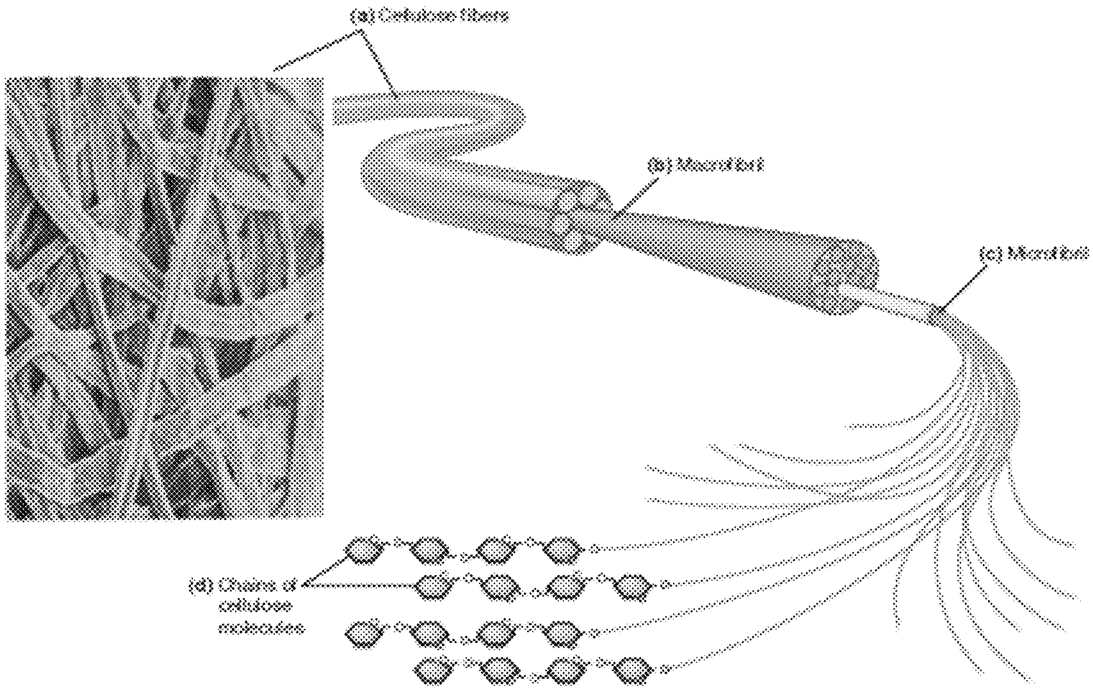
FIG. 1: Cellulose, molecules, fibrils and fibers.
Figure 2:
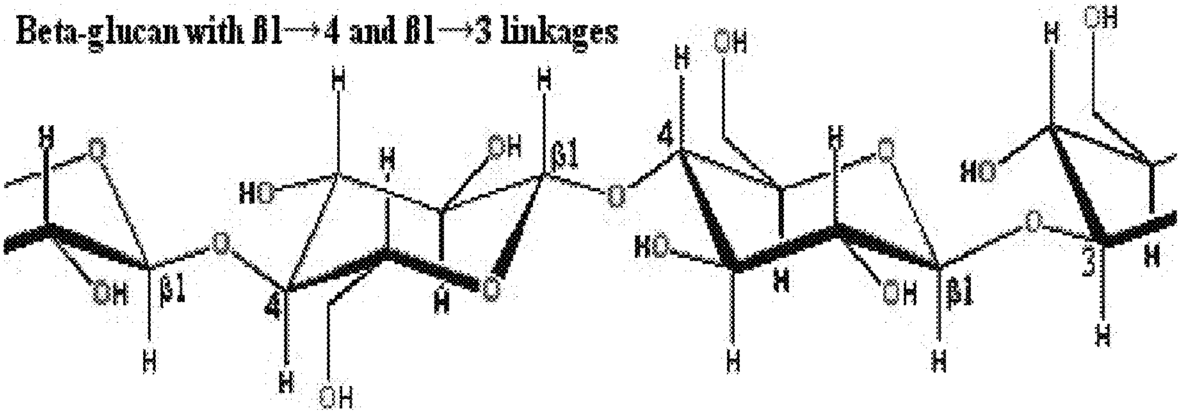
FIG. 2: Oat and Barley β-glucan schematic.

The main component of one set of the textile fibers is Cellulose. Cellulose is a polymer of β-D-glucopyranose, which forms linear chains consisting of β-1,4-linkages between the β-D-glucopyranose residues. Because of this structure it has a high affinity for itself and forms extended and stable fibrils, which themselves form into fibers via hydrogen bonding of hydroxyl groups on the β-D-glucopyranose residues. This is very well documented and is illustrated somewhat schematically in FIG. 1. Fabrics containing cellulose fibrils and fibers are well-known and include cotton, fabrics based on flax (linen), hemp and jute fibers as well as viscose and rayon textiles, which are derived from regenerated cellulose.

The other material types that can be advantageously treated using water-soluble β-glucans are those comprising mainly proteins, which are well-known to be polymers which are polypeptides. Polypeptides or proteins are a class of nitrogenous organic compounds having large molecules composed of one or more long chains of amino acids, bonded together via "peptide" bonds. Proteins are produced naturally as essential components of all living organisms, and particularly in animals as structural components of body tissues such as muscle, hair, etc. Fibrous proteins such as wool and silk are used in fabrics. In addition, protein rich feathers are often used in stuffing pillows, duvets and coats and in such applications can also be advantageously treated using water-soluble β-glucans.

Figure 3:
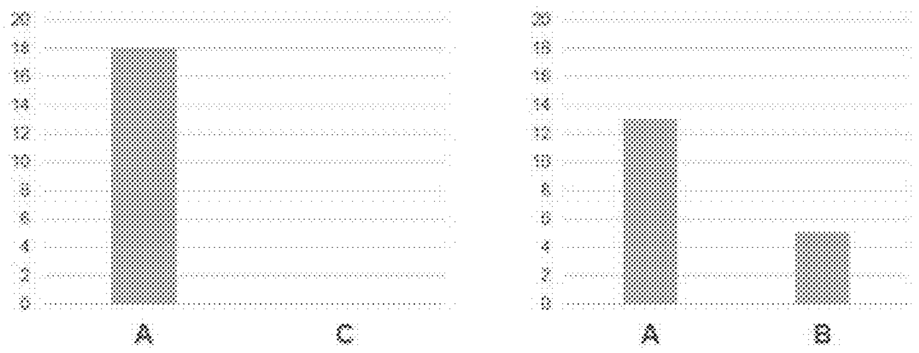
FIG. 3: Softening effect of washing detergent containing 5% β-glucan in comparison to Ecover market benchmark.

1,3:1,4-β-D-glucan (B glucan) is a polymer comprised of β-D-glucopyranose, but unlike cellulose, which comprises 100% β-1,4-linkages, cereal derived β-glucan comprises a mix of β-1,3-linkages and β-1,4-linkages. Oat and barley derived β-glucan is water soluble and consist of primarily β-1,3-linkages and β-1,4-linkages. Oat β-glucan in particular consists of about 70% (1→4)-linked and about 30% (1→3)-linked β-D-glucopyranosyl residues organised in blocks of (1→4)-linkage sequences (cellotriosyl and cellotetraosyl cellulose-like segments) separated by single (1→3)-linkages, as shown in FIG. 3. 1,3:1,4-β-D-glucan is a linear, non-branched polymer molecule and is soluble in water; however because of the mix of linkages, it does not spontaneously form fibrils like cellulose. Naturally occurring forms of β-glucan can have a molecular size of up to two million Daltons.

It has been discovered that the addition of β-glucan to cellulose-based or protein-based textile fabrics produces a sensorially verifiable softening effect on the treated textile.

The softening process may comprise adding the β-glucan to the textile as part of a washing detergent, or a conditioning or softening formulation, of the types typically added to washing machine regimes, as well as in hand-washing of clothes and fabrics such that the β-glucan is present in the formulation at levels ranging from 0.005-5 wt.-%, preferably 0.007-2 wt. %, more preferably 0.01-0.5 wt.-% (calculated based on the total weight of the formulation). During a machine wash, for example between 10-100 ml or grams of the formulation which includes β-glucan, more preferably 30-80 ml or gram of the formulation, is optimally added for each washing load containing typically 3-5 kg of textiles and fabrics. During a hand washing regime, the same 10-100 ml or gram of the formulation, more preferably 30-80 ml or gram of formulation will optimally be added to each 2-5 kg of textiles or fabrics. In such washing and conditioning treatments, the β-glucan dosage on the actual fabric will therefore range from mere micrograms per kg of treated textile or feather substrate, up to a number of milligrams. However, it has been observed that in some situations higher treatment levels using β-glucans is also beneficial (up to 20 gram per kg levels of treated fabric) but is economically less attractive.

The β-glucan used in the formulation may comprise at least 50%, at least 60% or at least 70% of the β-d-glucopyranosyl residues being joined by 1-4 linkages. Preferably the remainder of the linkages are 1-3 linkages. The β glucan may comprise at least one of oat β-glucan and barley β-glucan (i.e., that is β-glucan extracted from oat or barley grains). The β-glucans may have an average size of at least 50,000, at least 100,000, at least 200,000, at least 400,000, at least 800,000, at least 1,200,000 or at least 1,600,000 Daltons. Processes which describe extraction of long chain β-glucans, and any subsequent control of size are set out, for example, in EP 1 363 504 B1, EP 1 706 001 B1 and GB patent application 1501799.9.

The textile fabric to be treated may be derived from cotton, linen, viscose, other cellulose rich fibers, and/or from protein rich materials including silks, wools and feathers, or a mixture of cellulose fibers and protein rich materials.

Although wishing to avoid being limited by specific theoretical aspects, it is thought that the soluble β-glucan molecules have the potential to bind a number of cellulose or protein polymer chains and thereby have a softening effect on the fiber bulk and feel. The binding is thought to be achieved mainly by hydrogen bonding between the cellulose-like blocks of β-glucan (1→4)-linkage sequences (cellotriosyl and cellotetraosyl cellulose-like segments) and the cellulose or protein/polypeptide polymer chains.

The binding of soluble β-glucan molecules may further be increased by binding of the cellulose or polypeptide polymer chains to the cellotretraosyl ends of the β-glucan, and consequently, the ability of β-glucan to affect the properties of cellulose-based or protein-based fabrics may be increased by subjecting the β-glucan to treatment with a β-D-(1-3) glucanase prior to being added to the fabric. This will increase the number of β-glucan chains with free cellotretraosyl ends and thereby increase the number of cellulose or polypeptide polymer chains which may be bound by any given β-glucan chain.

However, there is a potential trade-off between maintaining the length of the β-glucan chains and increasing the number of cellotretraosyl ends. Therefore, in some situations, the enzymatic treatment with a β-D-(1-3) glucanase is sufficient to cleave no more than 20% of the β-d-(1-3) linkages, or no more than 10% of the β-d-(1-3) linkages or no more than 5% of the β-d-(1-3) linkages.

The β-glucan, prior to being subjected to the enzymatic treatment with a β-D-(1-3) glucanase may advantageously have an average size of at least 800,000 Daltons, or an average size of at least 1,200,000 Daltons, or an average size of at least 1,600,000 Daltons. In particular, the β-glucan, prior to being subjected to the enzymatic treatment with a β-D-(1-3) glucanase has an average size of at least 1,200,000 Daltons, and the enzymatic treatment is sufficient to cleave no more than 10% of the β-D-(1-3) linkages. Alternatively, the β-glucan, prior to being subjected to the enzymatic treatment with a β-D-(1-3) glucanase may have an average size of at least 1,600,000 Daltons, and the enzymatic treatment is sufficient to cleave no more than 10% of the β-D-(1-3) linkages.

The products containing the above mentioned β-glucans take the form of powders, liquids and "soap bar" type formulations in which the β-glucan is added at the requisite level suitable for adding in a laundry washing machine or hand washing application on fabrics (in the form of clothes, bedclothes, curtains, towels, pillow-cases etc) or even feather containing articles such as pillows, cushions, duvets, padded jackets and coats and the like.

The formulation may be produced, supplied and used as a "stand-alone" fabric softener in a liquid (water-borne) form, or the formulation may be produced, supplied and used as a "stand-alone" fabric softener in a powder form.

The formulation may be produced, supplied, and used as an integral part of a complete liquid formulation, including all clothes washing detergents and additives, for addition to laundry washing machines intended for the washing of clothes, fabrics, textile articles, feather containing articles.

The formulation may be produced, supplied, and used as an integral part of a complete powder formulation, including all clothes and fabric washing detergents and additives, for addition to laundry washing machines intended for the washing of clothes, fabrics, textile articles, feather containing articles.

The formulation may be produced, supplied, and used as an integral part of a complete liquid formulation, including all clothes washing detergents and additives, for use in handwashing of clothes, fabrics, textile articles, feather containing articles.

The formulation may be produced, supplied, and used as an integral part of a complete powder formulation, including all clothes washing detergents and additives, for use in handwashing of clothes, fabrics, textile articles, feather containing articles.

The formulation may be produced, supplied, and used as conditioning clothing mist for clothes, fabrics and shoes or while ironing the fabrics or textiles.

Detergents and surfactants utilised in the β-glucan containing formulations can be of all the major accepted types; anionics (for example Soap, Sodium Lauryl ethyl Sulphate, MIPA laureth sulphate, Alfa Olefin Sulphonate, Sodium Lauroyl Glutamate), Cationics (for example Esterquats, Alkyl Quaternary Ammoinium salts), Nonionics (for example Alkyl Polyglucoside, Fatty Alcohol Ethoxylate, Glucamides) and amphoterics (for example Cocamidepropyl Betaine, Amin Oxide, Amphoacetate).

Products, which are essentially formulations containing soluble β-glucan, as disclosed herein are therefore useful in a number of applications, for example,

- for addition to washing machines as a "stand-alone" fabric softener, in both liquid and powder formats, as part of a washing cycle,
- for addition to washing machines as a total washing formula in which the softener is an integral part of the formulation,
- for addition to hand washes as a "stand-alone" fabric softener, in both liquid and powder formats, as part of the washing process,
- for addition to articles (e.g., pillows, duvets, cushions, coats) containing feathers during a washing, spraying or wet-treatment process.

Further, oat β-glucan is known to have a soothing effect on skin (see, for example, GB patent application 1501799.9), and so in some embodiments, products of the present invention may be additionally beneficial to applications in which the treated fabrics come into contact with skin, in particular if the area of the skin is at risk of irritation, for example as is the case with underwear, towels, bedclothes.

Notably, if particular processes are used to obtain the β-glucan (for example as in EP 1 363 504 B1, EP 1 706 001 B1 and GB patent application 1501799.9) the β-glucan will be considered to be a natural product by food regulators, which may confer advantages in how the product is presented and labeled.

In order to demonstrate the softening effect of β-glucans, washing and conditioning formulations were prepared containing oat β-glucan as disclosed herein and applied to cotton fabrics and feather containing products (pillows and duvets, coats) during normal fabric treatment procedures in the following examples.

Example 1

6-Glucan Containing Formulation and Ecover Zero™ in a Comparative Cotton Fabric Softening Effect Test β-glucan containing formulations were tested for sensorial significant softening effects and compared to formulations without β-glucans or a market leading brand "Ecover Zero™" using panellists for the sensorial evaluation.

The comparison tests were set up as follows:

For all tests in the Examples disclosed herein the following β-glucan solution was used:

Soluble oat beta glucan 1% (0.95%-1.05%) CAS No: 9012-72-0

Oat maltodextrins 2% (1.50%-2.50%) CAS No: 9050-36-6

Water >94% CAS No: 7732-18-5

This solution contains 1 wt.-% of soluble oat beta glucan as calculated based on the total weight of the solution. The β-glucan used was extracted from oat grain in close to native form and has a polydisperse molecular weight distribution, as monitored using a gel permeation chromatography (GPC) method, with peak average molecular weight of at least 800,000 Daltons when compared to Pullulan standards.

The washing cycle was performed according to the AISE international test standard. For each Test formulations four thin and four thick terry cloth swatches were washed in a washing machine using the following laundry program: Cotton Short Water+: 40° C., 1400 rpm centrifugation, tap-water and 3 kg ballast. After the program finished, the swatches are dried overnight on a beaker. As soon as they were fully dried, the panelists started the evaluation. In a blind test, two swatches washed with different Test formulations were given to a panelist who made a sensorial evaluation. The panelist decided which one of the swatches felt softer/better. Equality was not an option. The panelist was allowed to use one hand or both hands for the evaluation. Thin and thick swatches were evaluated twice by each panelist, resulting in four tests per panelist.

The following Test formulations were tested:

Test Formulation A: washing detergent+5% β-glucan solution

Test Formulation B: washing detergent only

Test Formulation C: Ecover Zero™

Dosage: for each test, 95 g of test formulation was used. The washing detergent used contained the following ingredients: water, chelating agent, soap, nonionic surfactant, preservative, anionic surfactant and nonionic soil release polymer. The "5% β-glucan" solution used together with the washing detergent refers to a 5% dosage of the 1 wt.-% β-glucan solution of described above. Hence actual (dry solids basis) dosage of β-glucan in Test formulation A is 0.05 wt.-%.

Comparison Test 1a:

Test formulation A (washing detergent+5% β-glucan solution) was compared to Test formulation C (Ecover Zero™)

Comparison Test 1b:

Test formulation A (washing detergent+5% β-glucan solution) was compared to Test formulation B: (washing detergent only)

Results:

Almost 100% of the panelists felt the softening effect by Test Formulation A (washing detergent+5% β-glucan) in comparison to Test Formulation C (Ecover Zero™) as can be seen in FIG. 3. FIG. 3 also shows that it is the β-glucan that gives the softening effect to the swatches as most panelists found swatches washed with Test Formulation A (i.e. washing detergent+5% β-glucan) were softer than the swatches washed with Test Formulation B (washing detergent only).

Conclusion: Addition of 5% β-glucan to washing detergent gives a sensorial significant softening effect to cotton terry cloth swatches.

Example 2

Cleaning Effect of 6-Glucan Containing Washing Detergent is Comparable to that of Ecover Zero™

Figure 5:
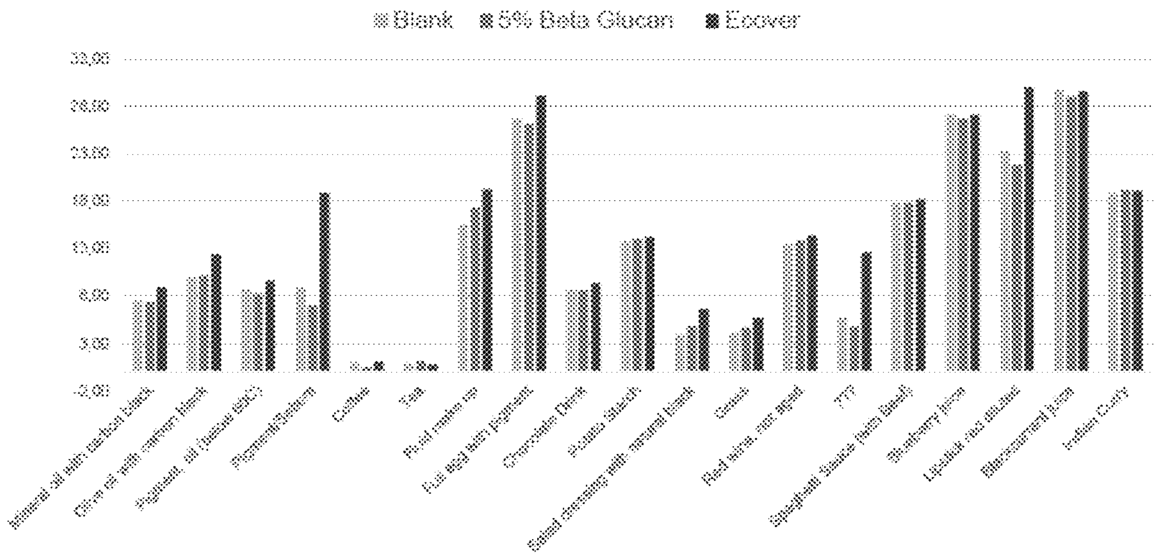
FIG. 5: Cleaning effect of washing detergent containing 1% β-glucan in comparison to Ecover market benchmark.

Cotton fabrics soiled with different stains (see FIG. 5) were washed using the Test Formulations A, B or C as described for example 1 above. Except for pigment/sebum, lipstick and red pepper (=??? in FIG. 5), Test Formulation A containing washing detergent+5% β-glucan solution gave comparable results to Ecover Zero™ (see FIG. 5).

Example 3

Softening Effect Remains at 1% Added 6-Glucan

In this test four thin and four thick terry cloth swatches were washed and thereafter tested by panelists as described in Example 1 above but instead Test Formulation A containing washing detergent+1% β-glucan solution was compared to Test formulation C containing Ecover Zero™.

Figure 4:
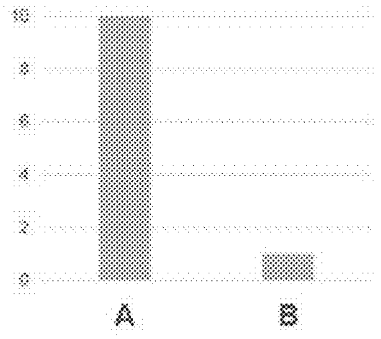
FIG. 4: Softening effect of washing detergent containing 1% β-glucan in comparison to Ecover market benchmark.

More than 90% of the panellists felt the softening effect in Test formulation A with 1% β-glucan in comparison to Ecover (Test Formulation B), as can be seen in FIG. 4. Thus, the softening effect is related to the amount of β-glucan present in the treatment formulation.

Example 4

Use of 6-Glucan Containing Washing Detergent for Washing of Feather-Containing Textiles Feather-containing pillows were subjected to a standard washing cycle using both a standard washing formulation "Formula Milo no. 1", a wool detergent from the Norwegian market and Formulation A: washing detergent+1% β-glucan (as described in Example 3 above). The washing conditions used a standard washing machine program for such articles: Program-wool/fine wash in temp 60° C. for 1.5 h and 800 rpm final spin. Formulation Dosage 50 ml.

The pillows were weighed before wash and after removal from the washing machine. The pillows were thus evaluated for wetness after exit from the washing machine.

The table below shows that the pillows washed with "Formula Milo no. 1" came out significantly wetter than the pillow washed with the oat β-glucan containing formulation. Consequently, it took longer to dry the pillows washed using "Formula Milo no. 1". In total, it required 3.4 h (3×16.5 min and the rest in 4 min cycles) of drying instead of 2.5 h (1×16.5 min and the rest in 4 min cycles) for the pillows washed using the oat β-glucan containing formulation.

| | Weight of the pillows/g | |
|---|---|---|
| | Washing detergent + 1% β-glucan | Milo ™ no. 1 |
| Before washing | 498 | 497 |
| After washing | 876 | 994 |
| Drying time | 2.5 h | 3.4 h |
| After drying | 489 | 481 |

An initial sensorial evaluation of the pillows did not result in conclusive results. However, most panelists judged the pillow washed with "Formula Milo™ no. 1" to be less soft.

Example 5

6-Glucan Containing Formulation and Milo™ Nr. 1 in a Comparative Cotton Fabric Softening Effect Test Besides the pillows, cotton terry cloth swatches were washed using “Formula Milo™ no. 1” or Formulation A (washing detergent+1% β-glucan) and evaluated as described in Example 1. The evaluation results showed that seven out of nine panelist judged the terry cloth swatches washed with the β-glucan containing formulation to be softer than the ones washed with Formula Milo™ no. 1 (see table 2).

TABLE 2

Softness of the terry cloth swatches-a sensorial evaluation

| Washing detergent +1% β-glucan | Formula Milo ™ no. 1 |
|---|---|
| X | |
| X | |
| X | |
| X | |
| | X |
| X | |
| | X |
| X | |
| X | |
| 7 | 2 |

Example 6

Conditioning clothing mist for clothes and fabrics with Eco oat β-glucan

A Conditioning Clothing Mist formulation containing the following ingredients was prepared (calculated based on the total weight of the formulation):

60-90 wt.-% water
0.1-0.2 wt.-% Lactic Acid
0.2 wt.-% perfume
3 wt.-% emulsifier (Polysorbate 20)
2 wt.-% % Methylpropanediol
0.1-20 wt.-% oat β-glucan solution
3 wt.-% Ethanol/Isopropyl alcohol
1 wt.-% preservative The pH was adjusted to 5.0-6.0 with 0.2 wt.-% Na-citrate buffer.

The oat β-glucan solution (1 wt.-%) used in the Conditioning Clothing Mist formulation is the same as disclosed above, but is preserved with the following ingredients:

Sodium Benzoate 1.0% CAS No: 532-32-1
Potassium Sorbate 0.6% CAS No: 24634-61-5
Cosphaderm LA-T 1.0% (consisting of: Levulinic Acid 0.25%-0.50% CAS No: 123-76-2, Glycerin 0.10%-0.25% CAS No: 56-81-5, Sodium Levulinate 0.10%-0.25% CAS No: 19856-23-6 and Aqua 0.10%-0.25% CAS No: 7732-18-5)

The viscosity of the sprayable Conditioning Clothing Mist formulation was <10 mPas.

The Conditioning Clothing Mist formulation was sprayed directly onto fabrics, textiles or shoes of all kinds covering the surface with 1-3 strokes per 100 $cm^2$. The sprayed items were allowed to dry.

In an alternative application the Conditioning Clothing Mist formulation may also be applied (sprayed) while ironing the fabrics or textiles.

The treated fabrics obtained a better surface structure with a soft feeling, and the fabric or clothing items kept a “fresh” feeling for a longer time than normally experienced. In addition, less wrinkles were noted when used on clothing items.

The invention claimed is:

1. A laundry composition and/or fabric softening agent comprising an anionic, cationic, nonionic, or amphoteric detergent and one or more water soluble 1,3:1,4-β-D-glucans derived from oats, barley or a combination thereof, wherein the anionic detergent is selected from the group consisting of soap, Sodium Lauryl ethyl Sulphate, MIPA laureth sulphate, Alfa Olefin Sulphonate, and Sodium Lauroyl Glutamate;

the cationic detergent is selected from the group consisting of Esterquats, and Alkyl Quaternary Ammonium salts;

the nonionic detergent is selected from the group consisting of Alkyl Polyglucoside, Fatty Alcohol Ethoxylate, and Glucamides;

the amphoteric detergent is selected from the group consisting of Cocamidepropyl Betaine, Amine Oxide, and Amphoacetate; and the one or more water soluble 1,3:1,4-β-D-glucans have a weight average molecular weight of at least 800,000 Daltons.

2. The laundry composition and/or fabric softening agent according to claim 1, wherein the one or more water soluble 1,3:1,4-β-D-glucans are derived from oat.

3. The laundry composition and/or fabric softening agent according to claim 1, wherein the one or more water soluble 1,3:1,4-β-D-glucans are derived from barley.

4. The laundry composition and/or fabric softening agent according to claim 1, wherein the one or more water soluble 1,3:1,4-β-D-glucans have a weight average molecular weight of at least 1,200,000 Daltons.

5. The laundry composition and/or fabric softening agent according to claim 1, wherein no more than 20% of the β-d-(1-3) linkages of the one or more water soluble 1,3:1,4-β-D-glucans have been cleaved.

6. The laundry composition and/or fabric softening agent according to claim 5, wherein no more than 10% of the β-d-(1-3) linkages of the one or more water soluble 1,3:1,4-β-D-glucans have been cleaved.

7. The laundry composition and/or fabric softening agent according to claim 6, wherein no more than 5% of the β-d-(1-3) linkages of the one or more water soluble 1,3:1,4-β-D-glucans have been cleaved.

8. The laundry composition and/or fabric softening agent according to claim 5, wherein the one or more water soluble 1,3:1,4-β-D-glucans, prior to being cleaved, have a weight average molecular weight of at least 800,000 daltons.

9. The laundry composition and/or fabric softening agent according to claim 5, wherein the one or more water soluble 1,3:1,4-β-D-glucans, prior to being cleaved, have a weight average molecular weight of at least 1,200,000 daltons, and no more than 10% of the β-D-(1-3) linkages are cleaved.

10. The laundry composition and/or fabric softening agent according to claim 5, wherein the one or more water soluble 1,3:1,4-β-D-glucans, prior to being cleaved, have a weight average molecular weight of at least 1,600,000 daltons, and no more than 10% of the β-D-(1-3) linkages are cleaved.

11. The laundry composition and/or fabric softening agent according to claim 5, wherein the β-D-(1-3) linkages of the one or more water soluble 1,3:1,4-β-D-glucans have been cleaved with a β-D-(1-3) glucanase.

12. The laundry composition and/or fabric softening agent according to claim 1, wherein the one or more 1,3:1,4-β-D-glucans are included in the composition in an amount of 0.005-5 wt.-%.

13. The laundry composition and/or fabric softening agent according to claim 12, wherein the one or more 1,3:1,4-β-D-glucans are included in the composition in an amount of 0.007-2 wt.-%.

14. The laundry composition and/or fabric softening agent according to claim 13, wherein the one or more 1,3:1,4-β-D-glucans are included in the composition in an amount of 0.01-0.5 wt.-%.

15. The laundry composition and/or fabric softening agent according to claim 1, wherein the composition and/or agent is a powder.

16. The laundry composition and/or fabric softening agent according to claim 1, wherein the composition and/or agent is a liquid.

17. A process for treating and softening textile fibres and/or fabrics derived from cellulose and/or protein-based fibres, comprising the step of treating the textile fibres and/or fabrics, as part of a washing regime, or a pre- or post-washing regime, with the laundry composition and/or fabric softening agent comprising an anionic, cationic, nonionic, or amphoteric detergent and one or more water soluble 1,3:1,4-β-D-glucans derived from oats, barley or a combination thereof, wherein the one or more water soluble 1,3:1,4-β-D-glucans have a weight average molecular weight of at least 800,000 Daltons.

18. The process according to claim 17, wherein the textile fibres and/or fabrics is of the group consisting of cotton, viscose or rayon, wool, silk, an article containing feathers or a combination thereof.

19. The process according to claim 17, wherein the textile fibres and/or fabrics are made from cotton.

20. The process according to claim 17, wherein the textile fibres and/or fabrics are made from viscose or rayon.

21. The process according to claim 17, wherein the textile fibres and/or fabrics are made from wool.

22. The process according to claim 17, wherein the textile fibres and/or fabrics are made from silk.

23. The process according to claim 17, wherein the textile fibres and/or fabrics are articles containing feathers.

* * * * *